UNITED STATES PATENT OFFICE.

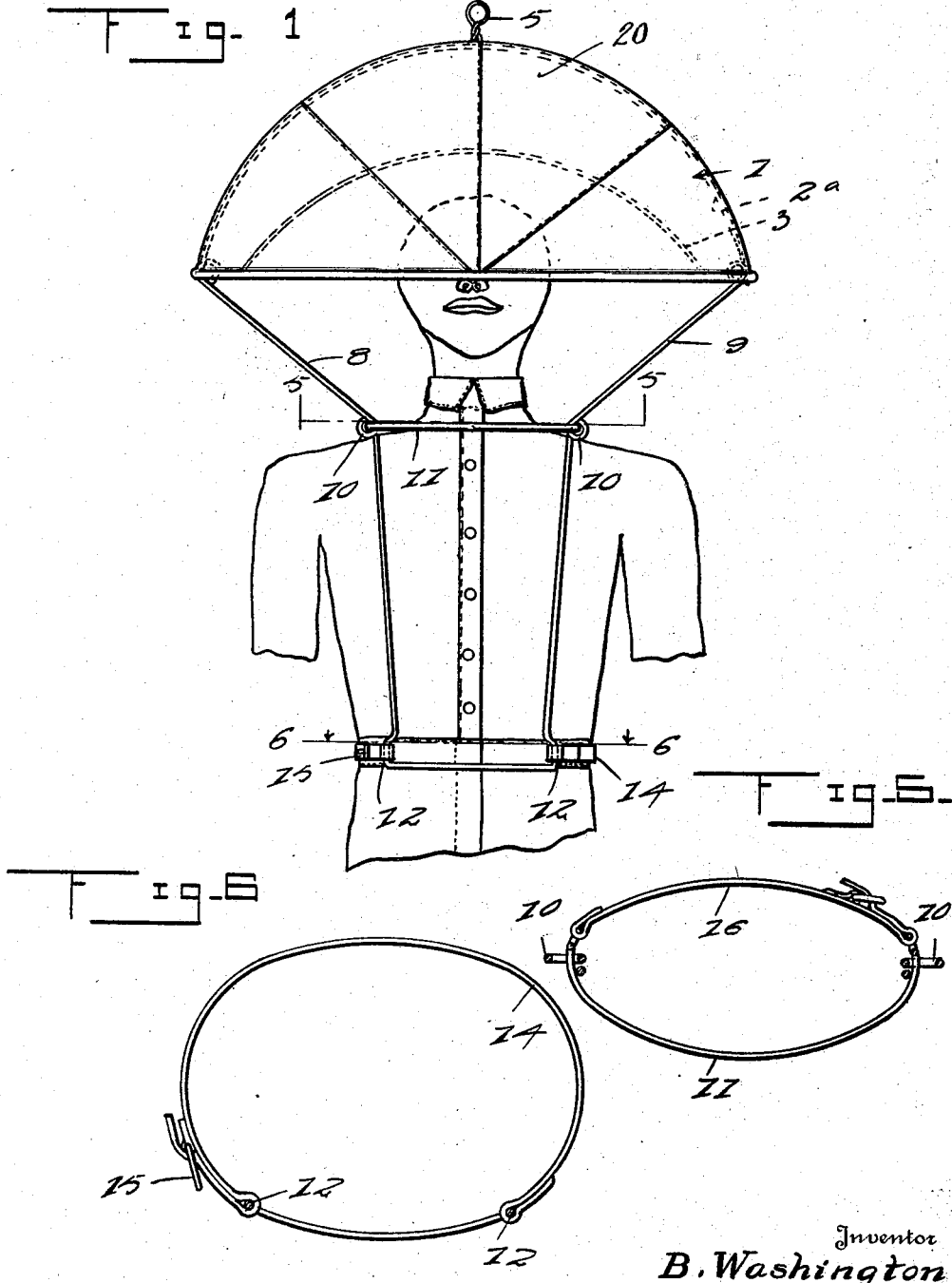

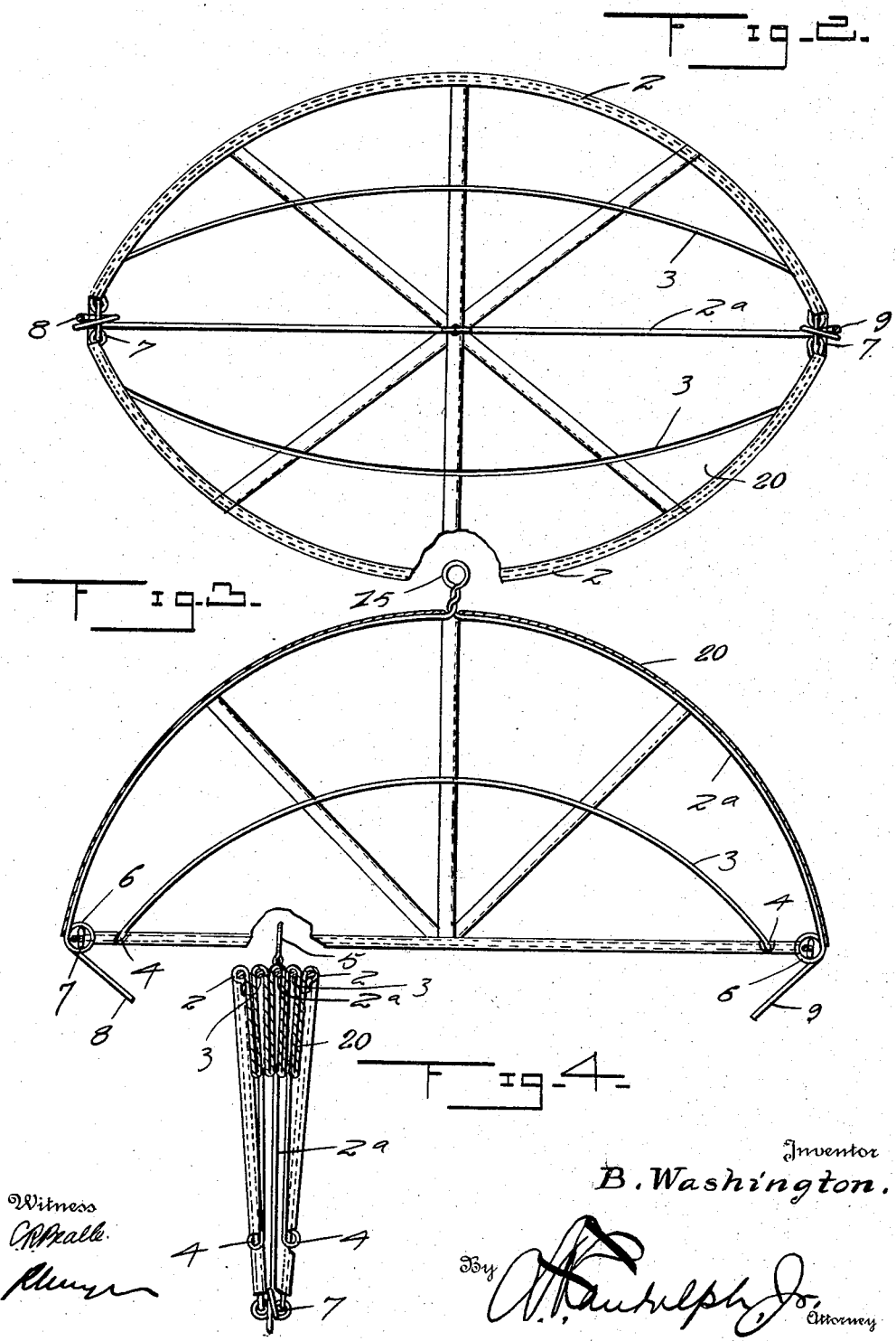

BEN WASHINGTON, OF SEVILLE, FLORIDA.

SUNSHADE.

1,217,542.  Specification of Letters Patent.  Patented Feb. 27, 1917.

Application filed August 16, 1916. Serial No. 115,223.

*To all whom it may concern:*

Be it known that I, BEN WASHINGTON, a citizen of the United States, residing at Seville, in the county of Volusia and State of Florida, have invented certain new and useful Improvements in Sunshades; and I do hereby declare the following to be a full, clear, and exact description of the invention, such as will enable others skilled in the art to which it appertains to make and use the same.

This invention relates to sun shades and the primary object of the invention is to provide a foldable sun shade, which has a structure connected thereto by means of which the sun shade may be attached to the body of a person and supported above his head, for shading the head of the wearer.

Another object of this invention is to provide a sun shade as specified, which is particularly designed for use by workers in an agricultural field, which will effectively shade their heads from the sun's rays, and which may be attached to the body in such a manner as not to interfere with the work done by the wearer.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views and in which:

Figure 1 is a view showing the invention applied,

Fig. 2 is a bottom plan view of the sun shade,

Fig. 3 is a sectional view through the sun shade,

Fig. 4 is a sectional view through the sun shade in a folded position,

Fig. 5 is a cross section on the line 5—5 of Fig. 1,

Fig. 6 is a cross section on the line 6—6 of Fig. 1.

Referring more particularly to the drawings, 1 designates the sun shade as an entirety which includes a plurality of substantially semi-circular shaped ribs 2, which form the edge and center braces of the sun shade. The stays or ribs 2 have ribs 3 attached thereto, as shown at 4. The ribs 3 are smaller than the ribs 2 and positioned intermediate each of the outer ribs 2 and the center rib, as clearly shown in Fig. 2 of the drawings. The center rib 2 extends upwardly through the cover 4 of the sun shade and has a loop 5 formed thereon, which is provided for hanging up the sun shade when it is not in use.

The central stay $2^a$, is coiled intermediate its ends to form loops 6, through which the ends of the edge stays 2 are connected through the medium of a link 7. The central stay $2^a$ is constructed of wire, and its ends extend downwardly and inwardly from the lower edge of the shade 1 forming braces 8 and 9 which extend downwardly to the shoulders of the wearer. The legs of the rods of which the stay $2^a$ is formed are coiled at the lower ends of the bracers 8 and 9, as shown at 10, about the shoulder engaging bar 11, and they extend downwardly therefrom, having their lower ends connected in any suitable manner and provided with straight portions 12 which are positioned at the belt of the wearer. A suitable strap or flexible member 14 is connected to one of the straight portions 12 and is adapted for extending about the waist of the wearer and over the other of the straight portions 12, as clearly shown in Fig. 6 of the drawings. A suitable buckle 15 is carried by the belt or strap 14 for attaching the lower end of the frame formed by the wire of which the rib $2^a$ is formed to the body of the wearer. A strap or analogous flexible member 16 is attached to one end of the shoulder bars 11 and extends about the neck of the wearer for connecting the upper portion of the frame or supporting structure formed by the rod of which the rib $2^a$ is formed about the shoulders of the wearer.

When the improved sun shade is not in use, it may be folded into a compact form as shown in Fig. 4 of the drawings.

The cover 20 of the sun shade is attached in any suitable manner to the outer rims or stays 2 and extends over the intermediate stays 3 and the central rib or stay $2^a$.

In reducing the invention to practice, certain minor features of construction, combination and arrangement of parts may necessitate alterations to which the patentee is entitled provided such alterations are comprehended within the scope of what is claimed.

What is claimed is:

1. In a sun shade structure, a pair of edge stays, a center rib, a cover connected to said edge stays and extending over said central rib, said central rib being constructed of wire and coiled intermediate of its ends, links connected to said coils, said center rib extending downwardly from said coil for forming braces, and a body engaging portion, a flexible belt connected to said body engaging portion and adapted for binding the body engaging portion about the body of a wearer.

2. In a sun shade structure, a pair of edge stays, a center rib, a cover connected to said edge stays and extending over said central rib, said central rib being constructed of wire and coiled intermediate of its ends, links connected to said coils, said center rib extending downwardly from said coil for forming braces, and a body engaging portion, a flexible belt connected to said body engaging portion and adapted for binding the body engaging portion about the body of a wearer, said central rib being coiled upwardly of said body engaging portion, and a shoulder engaging bar connected to said last named coiled portions and adapted for resting upon the shoulders of a wearer.

In testimony whereof I affix my signature in presence of two witnesses.

BEN WASHINGTON.

Witnesses:
W. W. TEDDER,
M. W. CLIFTON.

Copies of this patent may be obtained for five cents each, by addressing the "Commissioner of Patents, Washington, D. C."